June 23, 1970 R. W. SCHMIEDER 3,516,294
ACCELERATION SENSITIVE DEVICE
Filed April 12, 1966
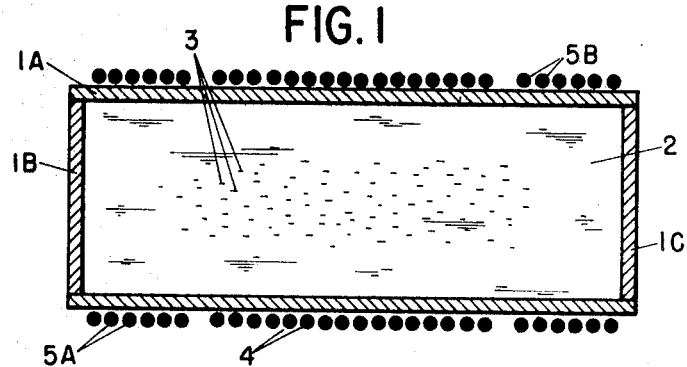
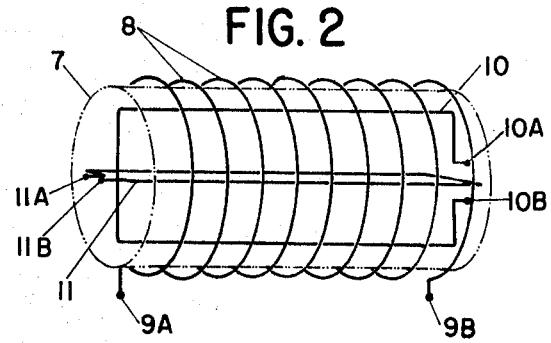 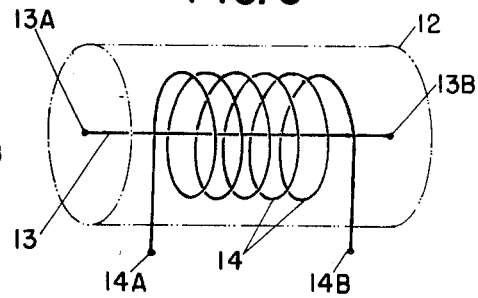
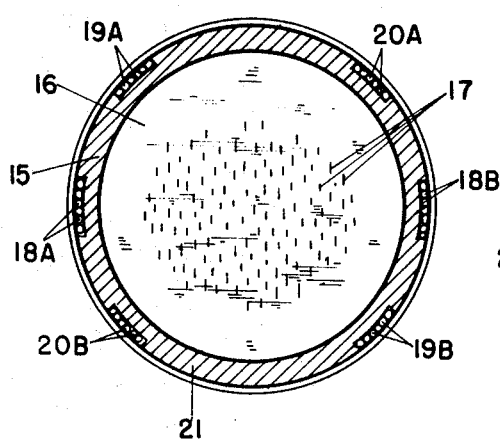 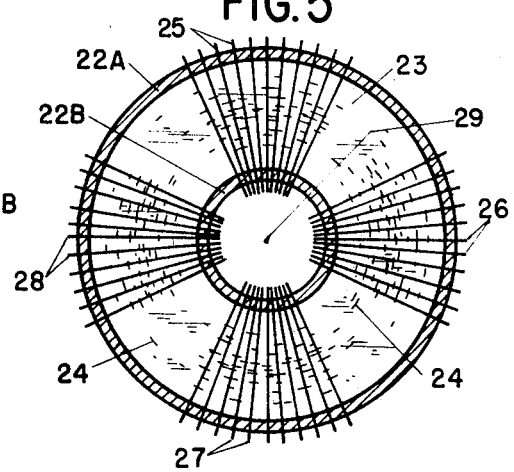
*INVENTOR.*
Robert W. Schmieder United States Patent Office 3,516,294
Patented June 23, 1970

3,516,294
ACCELERATION SENSITIVE DEVICE
Robert W. Schmieder, New York, N.Y.
(4295 Walnut Blvd., Walnut Creek, Calif. 94596)
Filed Apr. 12, 1966, Ser. No. 542,017
Int. Cl. G01p 15/08
U.S. Cl. 73—516　　　　　　　　　　　　8 Claims

ABSTRACT OF THE DISCLOSURE

This invention relates to various forms of a device for measuring acceleration, in which electric current is induced in a conductor by the relative motion of minute magnetic particles, suspended in a fluid-filled container and aligned by a magnetic field produced by a current in a second conductor, and the first conductor.

---

This invention relates to an acceleration sensitive device and more particularly to a device in which magnetic particles are suspended in a fluid contained within a hollow chamber, the acceleration being sensed by relative motion between the particles and a suitable set of sensing coils.

As is known, when the relative position or orientation of a magnetic field and a conductor is changed, an electric field is generated causing current to flow in the conductor. If the conductor is in the form of a wire coil, and the direction of relative motion is properly chosen, it is possible to detect very small changes in the relative positions of the coil and the magnetic field due to the additive nature of successive turns of the coil. The magnitude of the voltage thus induced in the sensing coil is proportional to the relative velocity between the coil and the field, and thus its change is proportional to the rate of change of the velocity, or the acceleration. Thus, any device which works on the principle of magnetic induction gives an output signal which directly gives the velocity and acceleration experienced by the device.

Nearly all conventional accelerometers make use of an inertial mass suspended by means such as springs, wires or magnetic fields to isolate it and prevent interference from its mounting. In general, the heavier the mass and the weaker the support, the greater will be the isolation and therefore the greater will be the sensitivity of the accelerometer. A compromise between these characteristics is normally made in relation to a specific application, such as small amplitude vibrations, very low frequencies, or the like.

For many applications, the size of the device is of no consequence, and the design of the suspension system for the inertial mass is usually definitive. However, for many cases, a device which is extremely small and rugged is desired, and the use of springs or similar mechanisms is impractical and expensive. Springs limit the response of the device to frequencies in a range around the resonant frequency of the system, and limits the amplitude of the impulse (the integral of the acceleration over the time it is applied) to a maximum determined by the throw of the suspension system.

It is one object of this invention to provide a device which is sensitive to acceleration and can be made considerably smaller than conventional accelerometers.

Another object of this invention is to provide an accelerometer which can be used over a very extended range of accelerations without damage to the device or loss of sensitivity or calibration.

Another object of this invention is to provide an accelerometer which can be used over a wide range of impulses without degradation of the output signal due to nonlinearity of response.

Another object of this invention is to provide a method for measuring acceleration using a device with the above characteristics, which can be made in a variety of shapes and arrangements to obtain sensitivity to acceleration in different directions, or to satisfy other requirements of shape.

Still another object of this invention is to provide a device that can be used as indicated above, can be manufactured easily and inexpensively, and can be easily adapted to automated manufacture.

In considering the operation of the device set forth in this invention, reference may be had to the description which follows, and to the attached drawings, wherein:

FIG. 1 is a section through one embodiment of the accelerometer which best illustrates the principle of the device;

FIG. 2 is a perspective view of a modification of the invention using a different arrangement of the coils;

FIG. 3 is a perspective view of another modification of the invention using still another arrangement of the coils;

FIG. 4 is a sectional view of another embodiment of the invention, used for sensing accelerations in three dimensions;

FIG. 5 is a section through still another embodiment of the invention, used for sensing accelerations around an axis of symmetry.

Referring to FIG. 1, a tubular enclosure is constructed from a tube 1A which is closed at its ends by two faceplates 1B and 1C, and contains a fluid 2, in which is suspended a large number of microscopic slivers 3 of a magnetic material such as iron which are all magnetized parallel to their long axes. Around the outside of the tube 1A are wrapped three sets of coils coaxial with each other and with the axis of the tube. The coil 4 near the center of the tube 1A issued to align the magnetic particles 3 along the axis of the tube. By causing a current to pass through the coils 4, a magnetic field is created within the tube and roughly parallel to its axis, and the particles 3 thus tend to align their axes along this direction in order to minimize their energies. The field of the particles 3 adds to the field due to the coils 4. Two other coils 5A and 5B are used to sense relative motion between the particles 3 and the tube 1A. Under quiescent conditions (acceleration equal to zero), the steady field of coils 4 and particles 3 will have no effect on the sensing coils 5A and 5B. When the device experiences an acceleration, the difference in densities between the particles 3 and the fluid 2 will cause relative motion between the two, the magnetic particles acting as inertial masses. However, the fluid 2 completely fills the container 1A and 1B so that the same relative motion occurs between the particles 3 and the sensing coils 5A and 5B. However, there is no relative motion between the holding coils 4 and the sensing coils 5A and 5B. Thus the signal that is generated in the sensing coils 5A and 5B is only that due to the particles 3. It is clear that the signal generated in coil 5A will be oppositely directed from the signal generated in coil 5B, but not necessarily of the same magnitude, since the average position of the particles 3 may lie closer to one of these coils than the other. If the particles 3 lay midway between coils 5A and 5B at the start of the acceleration, then the relative strengths of the two signals is an indication of their average displacement and therefore of the total impulse experienced by the device.

In FIG. 2 a different arrangement of the coils is shown. In this drawing, the position of the tube is indicated by phantom lines 7. The holding coil 8 is wound in a helix around the tube, and connected to the recording device through terminals 9A and 9B. The sensing coils 10 and 11 are made in the form of plane rectangular loops which are terminated by connectors 10A, 10B, 11A and 11B. The sensing coils 10 and 11 are located inside the tube with their planes perpendicular. The fluid and the magnetic particles (not shown) are arranged in substantially the same fashion as indicated in FIG. 1. In this arrangement, the device is sensitive to acceleration in two directions, those directions perpendicular to the planes of the sensing coils.

FIG. 3 indicates another modification of the sensing coils. Sensing coil 13 is merely a straight wire running along the axis of the tube, and terminated at the ends by connectors 13A and 13B. The holding coil 14 is a helix terminated by the connectors 14A and 14B, and located within the cylinder, the latter being represented by phantom lines 12. In this arrangement, the device will be sensitive to acceleration in any radical direction, since application of an acceleration in any radial direction will cause the average position of the group of magnetic particles to shift, thereby inducing a signal in the sensing coil 13.

FIG. 4 is a sectional view of another embodiment of the device, consisting of a spherical shell 15 filled with a fluid 16 in which is suspended the magnetic particles 17. The holding coils 18A and 18B are used as in the previous arrangements to align the particles 17 perpendicular to the axis of the coils 18A and 18B. The sensing coils are indicated in cross section by 19A and 19B and by 20A and 20B, while the third coil 21 is seen from the side. The principles of operation of this arrangement of the invention is the same as for the other embodiments described above. In this arrangement, however, three signals are obtained which represent the components of the acceleration in the three directions perpendicular to the sensing coils arranged in mutually perpendicular planes.

FIG. 5 is a section through still another embodiment of the invention, used for sensing accelerations around an the invention, consisting of a ring-shaped container with outer wall 22A and inner wall 22B, having any desired sectional shape. In fluid 23 within this container is suspended magnetic particles 24 in the manner described previously. A number of coils 25, 26, 27, and 28 are wound around ring 22 in such way that their axes form a ring midway between the two walls 22A and 22B of the container. Any desired combination of coils 25, 26, 27 and 28 may be used for the holding coils described above for other arrangements, and another combination is used for the sensing coils. In this embodiment, the invention is useful for detecting acceleration around the axis of symmetry 29 which is perpendicular to the plane of the section of FIG. 5.

The above embodiments of the invention are suggestive of many modifications in design and construction that may arise in the course of applying the principle; other modifications are in no way to be construed as outside the scope, generality or spirit of the invention. Such modifications as would be included within the domain of this invention are: the use of different fluids in the device, of greater or less viscosity or otherwise different; the wrapping of multiple layers in the coils to intensify the signal detected by them or the degree of alignment of the magnetic particles; the use of different sizes of magnetic particles, or particles of a different shape; use of a different container material to obtain specific mechanical or electrical properties; or varying the geometry of the coils for aligning and sensing the position and motion of the magnetic particles.

Also within the domain of this invention are the many ways of operating the different versions. For instance, in certain arrangements such as those illustrated in FIG. 4, it is possible to use the sensing coils as the holding coils, each being activated in sequence, the signal being read from the other two. Since this involves no real change in this invention, it does not constitute departure from the spirit thereof. Similarly, application of an alternating potential to the holding coils to prevent microscopic migration of the magnetic particles is merely a method of operating the device, and therefore within the scope of this invention.

I claim:

1. A device for measuring acceleration, comprising: a container filled with a fluid in which are suspended minute magnetic particles having a density different than the fluid; a coil wound around the container; means supplying a current to the coil to produce a magnetic field to align the particles; an electrical conductor located adjacent the suspended particles, whereby relative motion between the conductor and particles caused by acceleration produces a voltage in the conductor; and means to sense the voltage in the conductor.

2. A device as set forth in claim 1, wherein the container is a cylinder with closed ends, and the coil is wound coaxially around the central portion of the cylinder.

3. A device as set forth in claim 2, wherein the conductor is a pair of coils wound around the cylinder and coaxial with the first coil, but concentrated near the end portions of the cylinder.

4. A device as set forth in claim 2, wherein the conductor is a rectangular coil running lengthwise of the cylinder.

5. A device as set forth in claim 4, further including a second conductor in the form of a rectangular coil running lengthwise of the cylinder in a plane at right angles to the plane containing the first conductor, and means to sense the voltage in the second conductor.

6. A device as set forth in claim 2, wherein the conductor is in the form of a single wire passing through the axis of the cylinder.

7. A device as set forth in claim 1, wherein the container is a hollow sphere; the conductor is a coil wound around the sphere; and further including: two additional conductors in the form of coils wound around the sphere in planes substantially at right angles to each other and at right angles to the first conductor; and means to sense voltage produced in said two additional conductors.

8. A device as set forth in claim 1, wherein the container is in the form of a hollow ring; the coil is wound around the ring in planes perpendicular to the ring; and the conductor is a coil wound around the ring.

References Cited

UNITED STATES PATENTS 2,746,027   5/1956   Murray _____ 73—517 XR
2,783,643   3/1957   Sihvonen _____ 73—506 XR JAMES J. GILL, Primary Examiner